United States Patent
Lin et al.

(10) Patent No.: US 8,466,888 B2
(45) Date of Patent: Jun. 18, 2013

(54) INPUT DEVICE

(75) Inventors: Jao-Ching Lin, Taipei (TW); Ying-Ju Lai, Taipei (TW); Chi-Cheng Kuo, Taipei (TW); Chung-Yi Shen, Taipei (JP)

(73) Assignee: Touchscreen Gestures, LLC, Dallas, TX (US)

( * ) Notice: Subject to any disclaimer, the term of this patent is extended or adjusted under 35 U.S.C. 154(b) by 272 days.

(21) Appl. No.: 12/770,024

(22) Filed: Apr. 29, 2010

(65) Prior Publication Data

US 2011/0216005 A1 Sep. 8, 2011

(30) Foreign Application Priority Data

Mar. 4, 2010 (TW) ................................ 99106283 A

(51) Int. Cl.
*G06F 3/041* (2006.01)
(52) U.S. Cl.
USPC ............ 345/173; 345/168; 345/172; 715/773
(58) Field of Classification Search
USPC . 345/172–178; 341/22–24; 178/18.01–20.04; 455/566; 715/773
See application file for complete search history.

(56) References Cited

U.S. PATENT DOCUMENTS

| | | | | |
|---|---|---|---|---|
| 5,053,758 A | * | 10/1991 | Cornett et al. | 345/174 |
| 5,543,590 A | | 8/1996 | Gillespie et al. | |
| 5,612,719 A | * | 3/1997 | Beernink et al. | 345/173 |
| 5,943,052 A | | 8/1999 | Allen et al. | |
| 6,199,125 B1 | * | 3/2001 | Cortesi | 710/67 |
| 6,369,803 B2 | * | 4/2002 | Brisebois et al. | 345/173 |
| 6,459,424 B1 | * | 10/2002 | Resman | 345/173 |
| 6,690,365 B2 | * | 2/2004 | Hinckley et al. | 345/173 |
| 7,576,732 B2 | * | 8/2009 | Lii | 345/173 |
| 2004/0108994 A1 | * | 6/2004 | Kato | 345/171 |
| 2004/0145574 A1 | * | 7/2004 | Xin et al. | 345/173 |
| 2005/0253817 A1 | * | 11/2005 | Rytivaara et al. | 345/173 |
| 2007/0142093 A1 | * | 6/2007 | Mikuni et al. | 455/566 |
| 2008/0036742 A1 | * | 2/2008 | Garmon | 345/173 |
| 2008/0036743 A1 | * | 2/2008 | Westerman et al. | 345/173 |
| 2008/0042978 A1 | * | 2/2008 | Perez-Noguera | 345/168 |
| 2009/0195518 A1 | * | 8/2009 | Mattice et al. | 345/177 |
| 2009/0327978 A1 | * | 12/2009 | Hamadene et al. | 715/863 |
| 2010/0259493 A1 | * | 10/2010 | Chang et al. | 345/173 |

FOREIGN PATENT DOCUMENTS

CN 101493747 A 7/2009

* cited by examiner

*Primary Examiner* — Alexander Eisen
*Assistant Examiner* — Sanjiv D Patel
(74) *Attorney, Agent, or Firm* — Winston Hsu; Scott Margo

(57) ABSTRACT

An input device includes a contact sensing surface having at least one key region and a controller. The controller includes: a position-detecting unit configured to detect the position on the contact sensing surface contacted by an object, a memory unit configured to store at least one functional data each corresponding to a key function, a key-triggering unit configured to read out the functional data in the memory unit and activate the corresponding key function without a sliding into the key region, a key function setting unit configured to change the functional data based on the direction and distance of the object sliding within the key region. With this arrangement, the key function setting unit can reduce the number of the keys regions virtually provided on the contact sensing surface, thereby providing an intuitive operation of key functions for a user.

11 Claims, 8 Drawing Sheets

INPUT DEVICE

BACKGROUND OF THE INVENTION

1. Field of the Invention

The present invention relates to an input device, and in particular to an input device having a contact sensing surface, wherein the contact sensing surface is provided with a key region with changeable functions based on a sliding trajectory detected within the key region.

2. Description of Prior Art

There are many kinds of input devices used for electronic products, such as mechanical keys at an earlier stage, a keyboard, a mouse, a handwriting tablet, and a touch pad for a modern portable electronic product. The input device has evolved from a single-function mode into an integrated multiple-function mode.

In addition to directly combine a keyboard, a touch pad and a handwriting tablet into one input module, an integrative touch pad with functions of track pad and key pad is developed. The contact sensing surface of a touch pad can detect the contact action of an object and output the position of the object on the contact sensing surface. Therefore, a touch pad can be used for an integrative input device by dividing its contact sensing surface into several regions: one for the key pad, one for the track pad, and even more for the handwriting pad.

Using the several regions on the contact sensing surface for integrating track pad and key pad can save a space for arranging mechanical keys, connecting lines and control ICs. Thus, the touch pad is widely used in various kinds of compact portable electronic devices. Even, the contact sensing surface is provided on a casing of a traditional mouse for integrating the functions of a left key, a right key, and a scrolling wheel.

When more keys are used, a larger key pad region for arranging these keys is needed. As a result, the dimension of the contact sensing surface is getting larger, which not only violates the requirements for compact design but also reduces the convenience in use due to the complicated arrangement of keys.

Thus, a common solution is used via a mode switch. For example, the whole contact sensing surface is used as a track pad for cursor operation mode and changed to a key pad when an external button (switch) is pressed. Through a switch between different modes, even a small-size contact sensing surface can provide more than one input mode.

However, switching modes takes time for launching a different operation mode and it may interrupt the input operation. When the user has to alternately switch between modes, it makes a lot of very inconvenience and takes a lot of waiting time for every mode switch. For example, scrolling up/down, paging up/down, rotating images, zooming in/out a window, playing audio/video signals, forwarding, and reversing are frequently used in Window System.

Therefore, if a key region of the contact sensing surface has more than one corresponding functions which can be switched without a prior switching action, the diversity, highly-integrated property, and convenience of an input device can be dramatically improved.

SUMMARY OF THE INVENTION

In order to solve the above problems, an objective of the present invention is to provide an input device, which is capable of expanding its input functions.

Another objective of the present invention is to provide an input device without reducing a region for a sliding movement on a contact sensing surface.

A further objective of the present invention is to provide an input device having a contact sensing surface to provide several key functions, thereby reducing the switching of modes and simplifying its operation.

In order to achieve the above objectives, the present invention is to provide an input device including a contact sensing surface and a controller. The contact sensing surface is contacted by at least one object. The contact sensing surface has at least one key region. The controller is electrically connected to the contact sensing surface. The controller includes a position-detecting unit, a memory unit, a key-triggering unit, and a key function setting unit. The position-detecting unit is configured to detect a position on the contact sensing surface contacted by the object. The memory unit is configured to store at least one functional data each corresponding to a key function. When the object contacts the key region of the contact sensing surface without a sliding into the key region, the key-triggering unit is configured to read out the functional data stored in the memory unit and activate the corresponding key function of the read functional data. When the key-triggering unit activates the corresponding key function of the functional data, the key function setting unit is configured to change the functional data based on a direction and a distance of the object sliding within the key region and activates another key function corresponding to the changed functional data.

The present invention further has an original data restoring unit is configured to detect a leaving period after the object leaves the contact sensing surface. If the leaving period is larger than a reference period, the original data restoring unit is configured to generate a restoring signal to restore the functional data in the memory unit as a preset original data.

DETAILED DESCRIPTION OF THE INVENTION

The structural and functional features of the present invention will be described with reference to preferred embodiments shown in the accompanying drawings.

Figure 1:
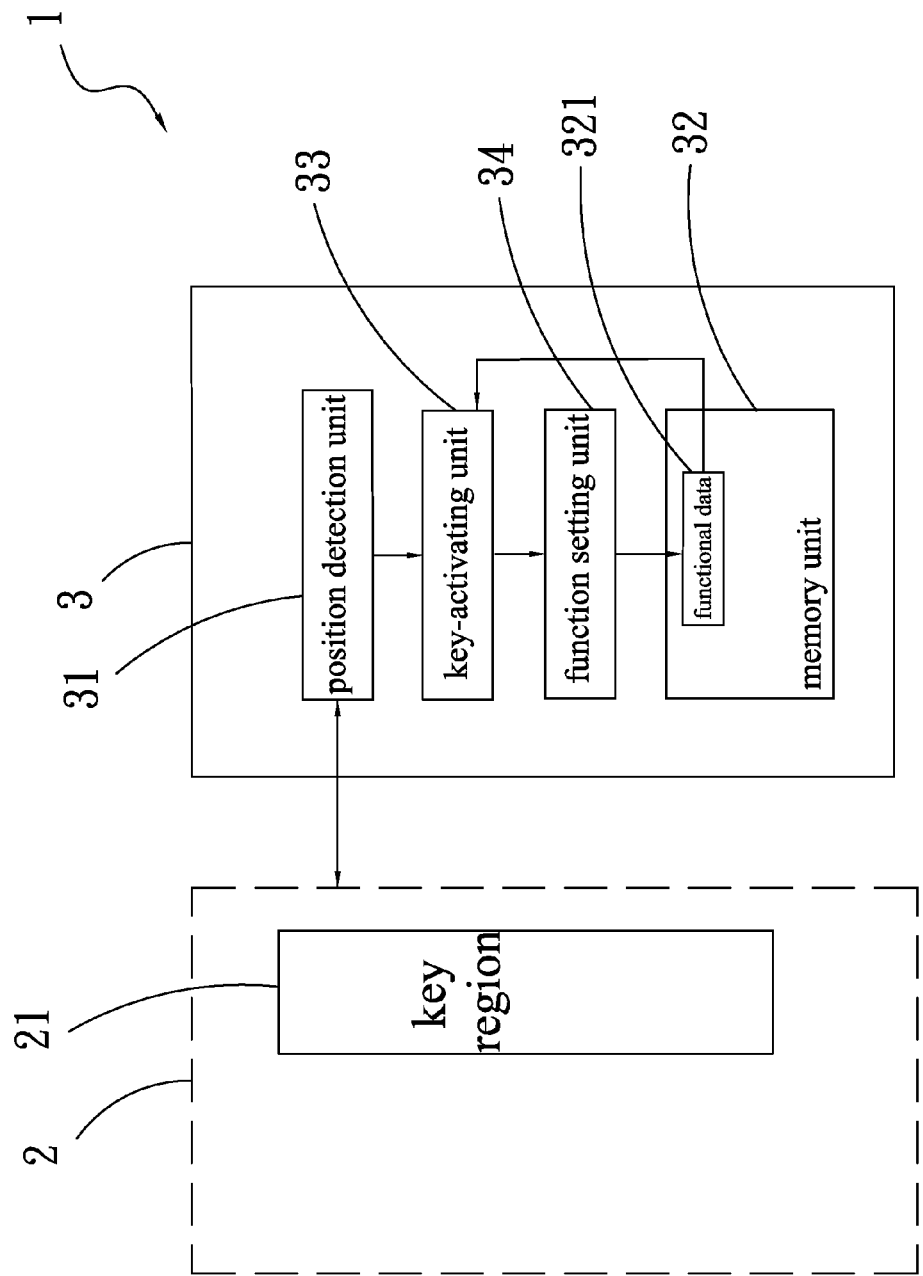
FIG. 1 is a block view showing an input device of the present invention.

Please refer to FIG. 1. The input device 1 includes a contact sensing surface 2 and a controller 3. The underside of the contact sensing surface 2 is arranged with a plurality of contact detectors (not shown) for detecting a contact of at least one object. The contact detector may be a resistance-type, a capacitor-type, an-optical type, or an acoustic-type detector configured to generate a response to the contact of the object and identify the position on the sensing surface 2 contacted by the object. The contact sensing surface 2 has at least one key region 21. The controller 3 is electrically connected to the contact sensing surface 2. The controller 3 includes a position-detecting unit 31, a memory unit 32, a key-triggering unit 33, and a key function setting unit 34. The position-detecting unit 31 is configured to detect the coordinates of the position on the contact sensing surface 2 contacted by the object. The key-trigger unit 33 is configured to determine whether the object is located in the key region 21 based on the above-obtained coordinates, thereby triggering a key function corresponding to the key region 21. When the key region 21 is really triggered, the key-triggering unit 33 is guided to read out a functional data 321 stored in the memory unit 32 as a preset function of the corresponding key in the key region 21. Also, when the key region 21 is really triggered, the key function setting unit 34 is configured to detect whether the object is sliding on the key region 21 or not, thereby changing the functional data 321 stored in the memory unit 32 based on the sliding distance and direction of the object.

Figure 2:
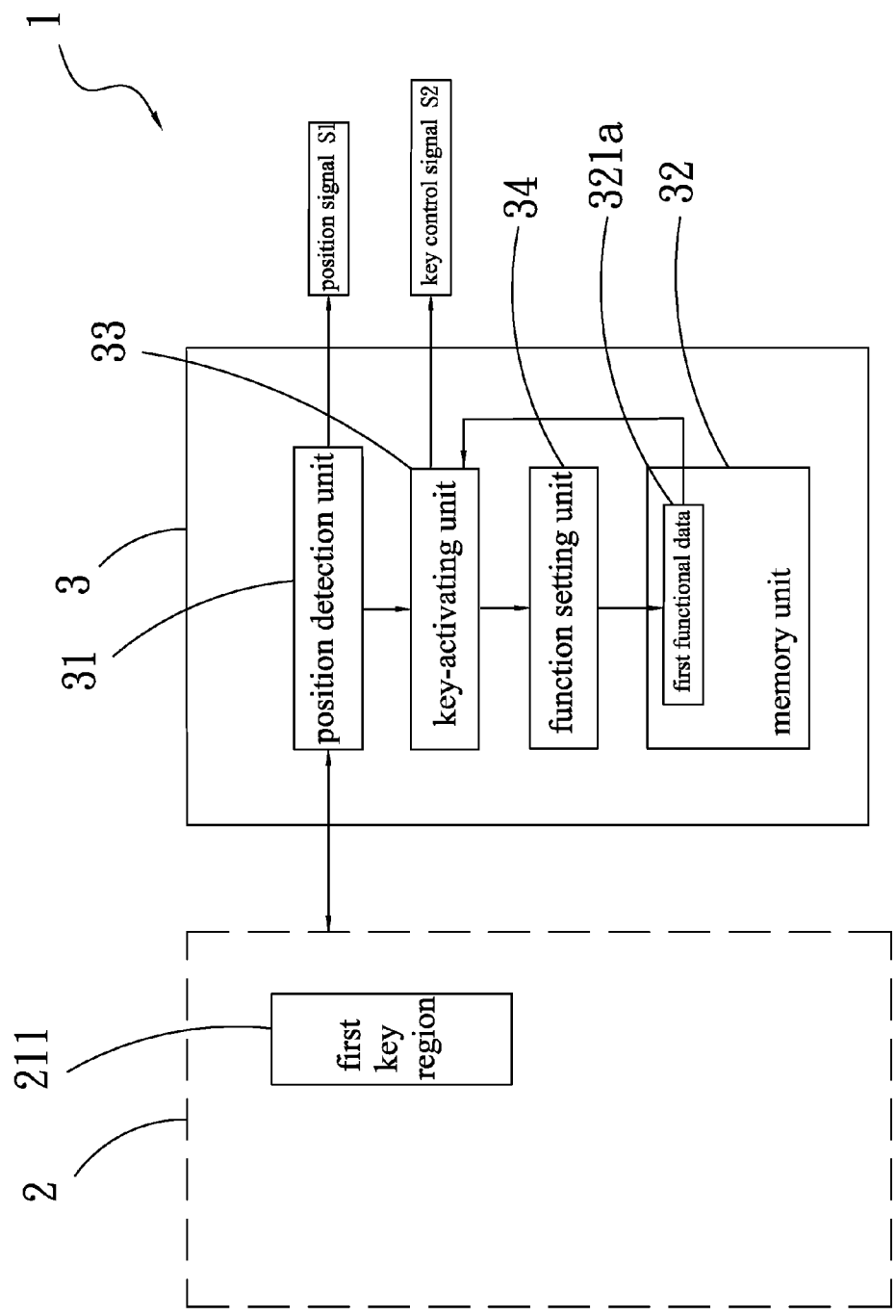
FIG. 2 is a block view showing the operation of the input device of the present invention.

Please refer to FIG. 2. In the present embodiment, the key region 21 is divided into a first key region 211. The position-detecting unit 31 is configured to detect the position on the contact sensing surface 2 contacted by the object and output a positional signal S1 relating to the contact position. If the object contacts the first key region 211 when contacting the contact sensing surface 2 without a sliding into the key region, the key-triggering unit 33 is configured to recognize this action as a first key-triggering action, and then read out a first functional data 321*a* stored in the memory unit 32, thereby generating a key control signal S2 based on the first functional data 321*a*.

For example, the first functional data 321*a* may be a scrolling-down control signal, a flag, a parameter value, or a set of predetermined values. In the present embodiment, the first functional data 321*a* is a flag. When the first functional data 321*a* represents "flag=1", the key-triggering unit 33 is configured to generate a key control signal S2 for a scrolling-down action. When the first functional data 321*a* represents "flag=0", the key-triggering unit 33 is configured to generate a key control signal S2 for a scrolling-up action.

Figure 3B:
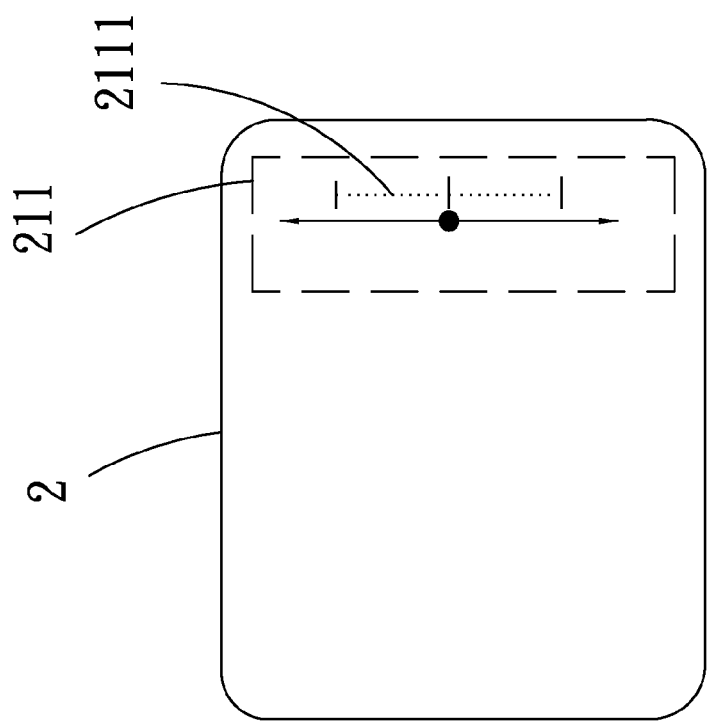
FIG. 3B is a schematic view showing the input device of the present invention on which the object slides on the first key region in a vertical direction.
Figure 3A:
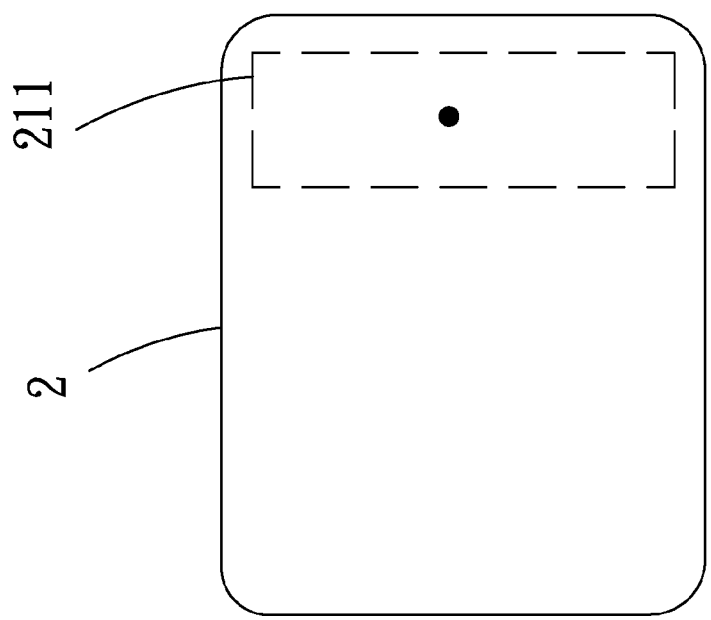
FIG. 3A is a schematic view showing the input device of the present invention on which an object contacts a first key region.
Figure 3D:
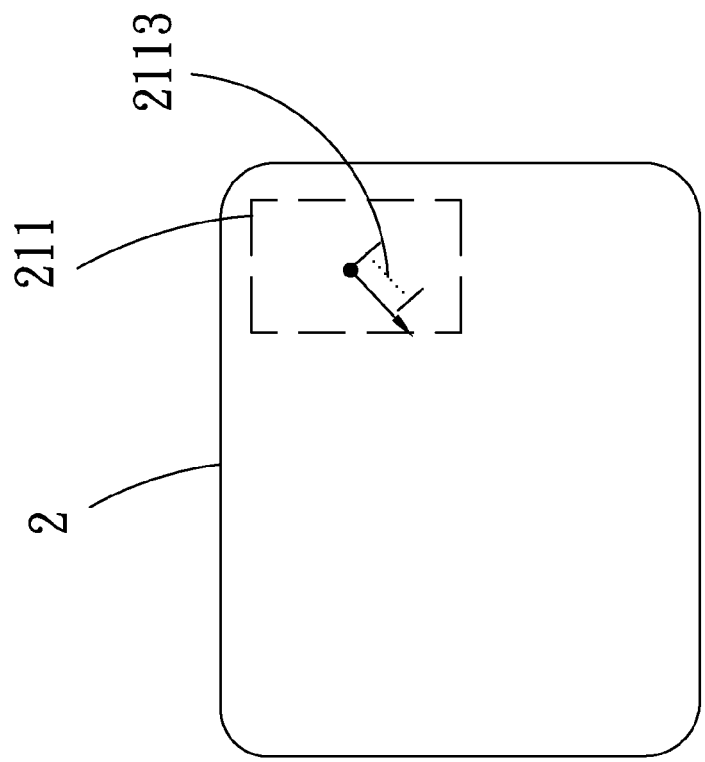
FIG. 3D is a schematic view showing the input device of the present invention on which the object substantially slides to down-left, down-right, up-left or up-right corner of the first key region.
Figure 3C:
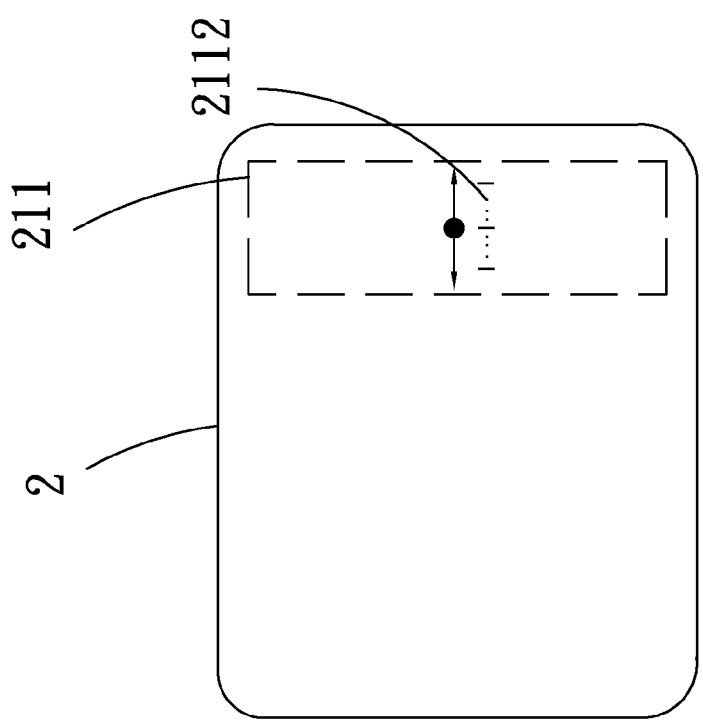
FIG. 3C is a schematic view showing the input device of the present invention on which the object slides on the first key region in a horizontal direction.
Figure 3E:
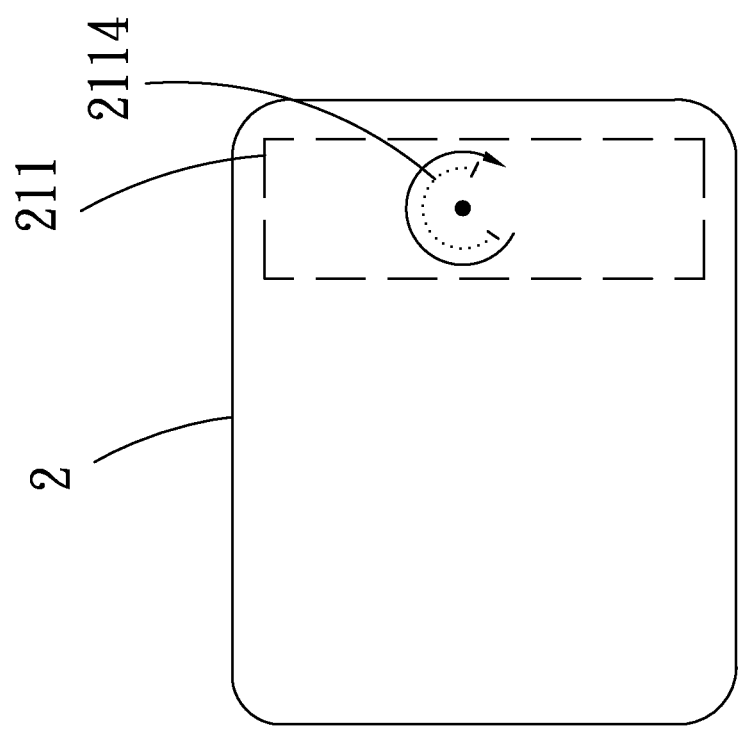
FIG. 3E is a schematic view showing the input device of the present invention on which the object substantially slides on the first key region counter-clockwise or clockwise.

As shown in FIGS. 2, 3A, 3B, the first functional data 321*a* is set to represent "flag=1", so that the key-triggering unit 33 sends out the key control signal S2 for a scrolling-down action once the first key region 211 is triggered. The first key region 211 has at least one predetermined distance for comparison with the sliding direction and distance of the object. The at least one predetermined distance includes a first distance 2111 (as shown in dotted lines) for comparison with a vertical straight movement. When the first trigger region 211 is triggered, the key function setting unit 34 detects whether the distance of the object sliding on the first key region 211 is larger than the first distance 2111 or not. If positive, the first functional data 321*a* stored in the memory unit 32 is changed to represent "flag=0" to correspond to an upward sliding of the object. If negative, the first functional data 321*a* keeps to represent "flag=1" to correspond to a downward sliding of the object. Further, in the present embodiment, if the first functional data 321*a* has changed from "flag=1" to "flag=0", when the first key region 211 is triggered again, the key-triggering unit 33 will read out the first functional data 321*a* stored in the memory unit 32 to thereby generate a key control signal S2 for a scrolling-up action (at this time, the first functional data 321*a* represents "flag=0" but not "flag=1"). The key control signal for a scrolling-up or scrolling-down action is used as an example, and it may be changed as a paging-up or paging-down action, or a forwarding or reversing action. The operating functions of the present invention are not limited to the above-mentioned forms.

Please refer to FIGS. 2, 3C, 3D and 3E again. The first key region 21 has at least one predetermined distance for comparison with the sliding of the object. The at least one predetermined distance further includes a second distance 2112 (as shown in dotted lines) for comparison with a horizontal straight movement. When the distance of the object sliding leftwards on the first key region 211 is larger than the second distance 2112, the key function setting unit 34 will change the first functional data 321*a* in the memory unit 32. As a result, in the present embodiment, the changed first functional data 321*a* represents a key function of scrolling leftwards or paging leftwards, so that the key function represented in the first key region 211 can generate an action of scrolling rightwards or paging rightwards. At this time, when the distance of the object sliding rightwards in the first key region 211 is larger than the second distance 2112, the changed functional data 321 represents a key function of scrolling rightwards or paging rightwards, so that the key function represented in the first key region 211 can generate an action of scrolling leftwards or paging leftwards.

The first key region 211 of the contact sensing surface 2 also has a third distance 2113 (as shown in dotted lines) for comparison with an oblique movement of the object. When the distance of the object sliding substantially to down-left, down-right, up-left or up-right corner of the first key region 211 is larger than the third distance 2113, the key function setting unit 34 will change the first functional data 321*a* in the memory unit 32. As a result, in the present embodiment, the changed first functional data 321*a* represents a key function of zooming out or zooming in a window. The first key region 211 of the contact sensing surface 2 also has a fourth distance 2114 (as shown in dotted lines). When the distance of the object sliding counter-clockwise or clockwise on the first key region 211 is larger than the fourth distance 2114, the key function setting unit 34 will change the first functional data 321*a* in the memory unit 32. As a result, in the present embodiment, the changed first functional data 321*a* represents a key function of rotating images in the window.

Figure 4:
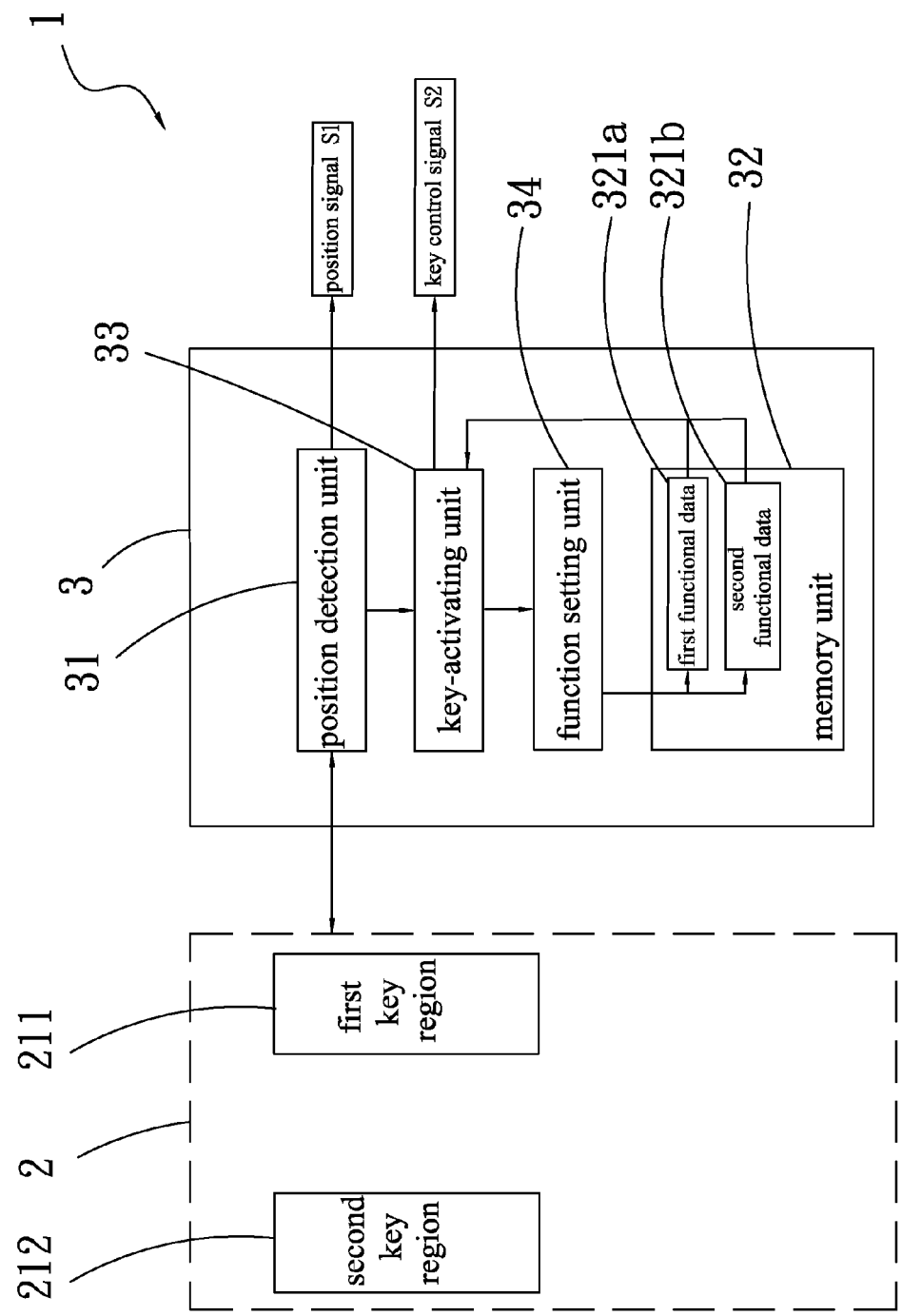
FIG. 4 is another block view showing the operation of the input device of the present invention.
Figure 5B:
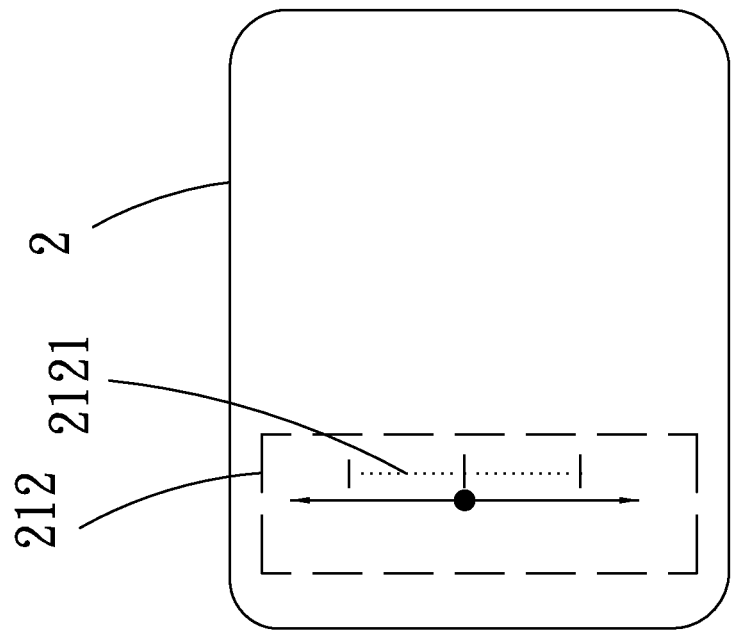
FIG. 5B is a schematic view showing the input device of the present invention on which the object slides on the second key region in a vertical direction.
Figure 5A:
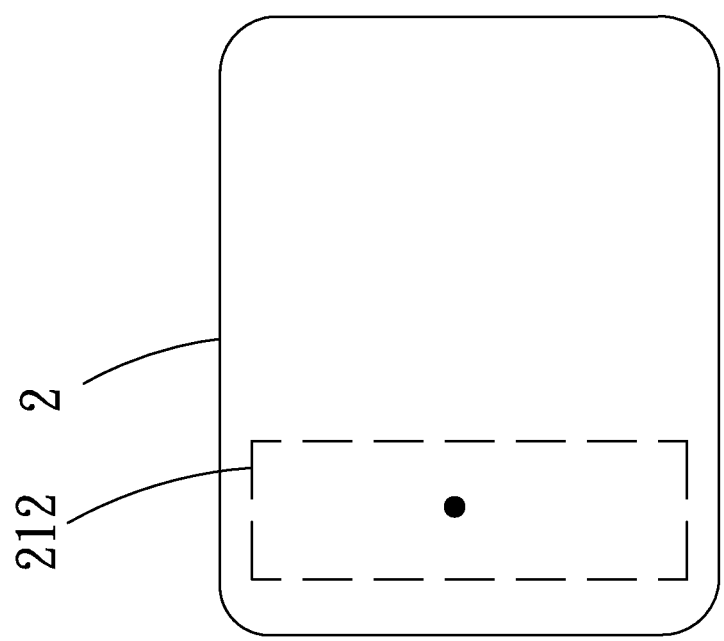
FIG. 5A is a schematic view showing the input device of the present invention on which an object contacts a second key region.

Please refer to FIGS. 4, 5A and 5B, which show another preferred embodiment of the present invention. The present embodiment is substantially identical to the previous embodiment and the difference there between is as follows. The key region 21 is divided into a first key region 211 and a second key region 212. The second key region 21 of the contact sensing surface 2 has at least one predetermined distance for comparison with the movement of the object. The at least one predetermined distance further includes a fifth distance 2121 for comparison with a vertical straight movement. When the object contacts the second key region 212 of the contact sensing region 2 without a sliding into the key region, the key-triggering unit 33 is configured to read out the second functional data 321b stored in the memory unit 32 and generate a corresponding key control signal S2 based on the second functional data 321b. When the second key region 212 is triggered, the key function setting unit 34 is configured to detect the object sliding on the second key region 212 and then change the second functional data 321b in the memory unit 32 based on the direction and distance of the object sliding on the second key region 212.

Figure 6:
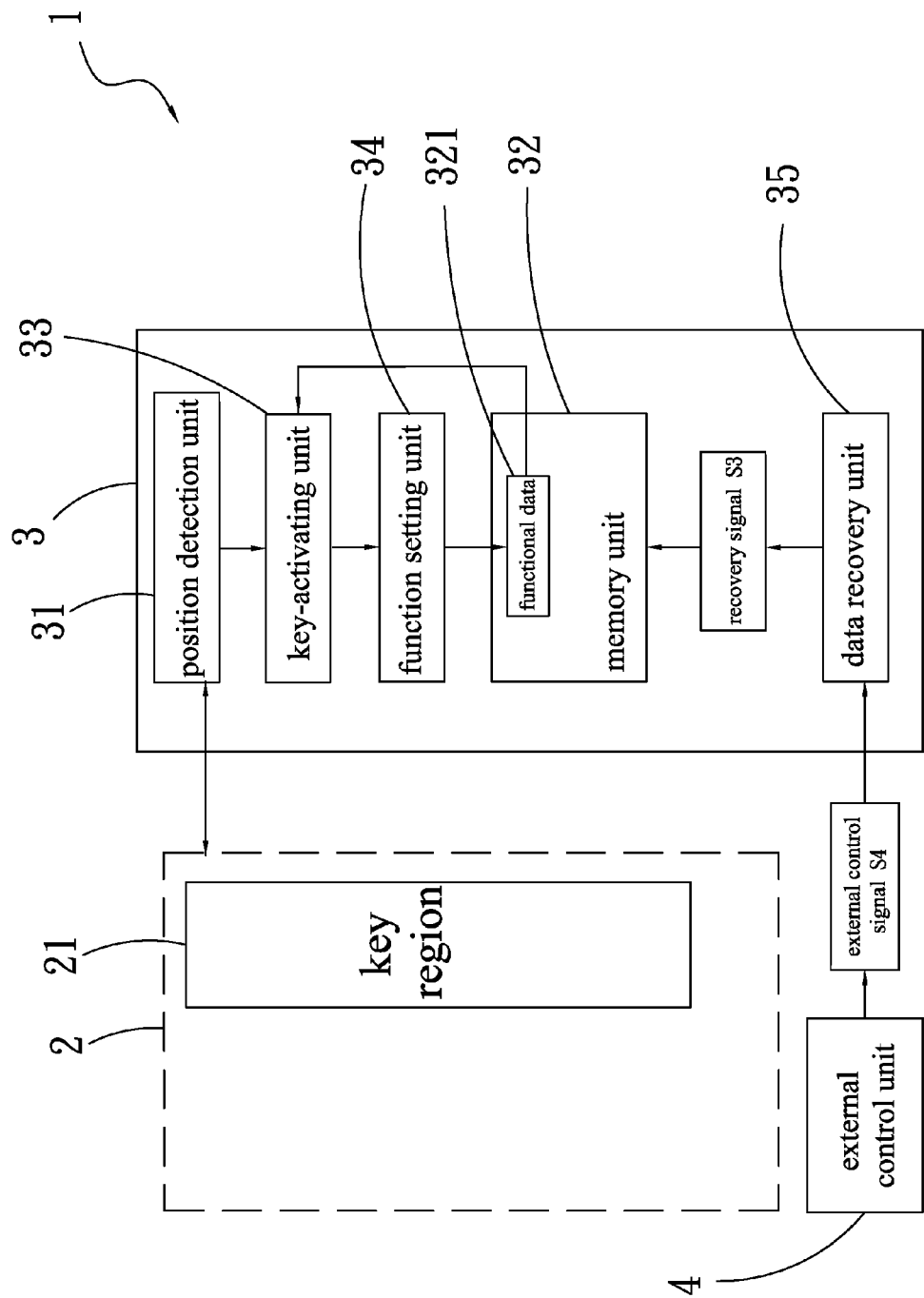
FIG. 6 is a further block view showing the operation of the input device of the present invention.

Please refer to FIG. 6. The input device 1 further includes an original data restoring unit 35 configured to detect a leaving period after the object leaves the contact sensing surface 2. When the leaving period is larger than a reference period, the original data restoring unit 35 is configured to generate a restoring signal S3. The input device 1 further includes an external control unit 4. The external control unit 4 can receive an external control signal S4 to make the original data restoring unit 35 to generate the restoring signal S3 by means of which the functional data 321 in the memory unit 32 can be restored as a preset original data. Either or both of the above two mechanisms for generating the restoring signal S3 can be used because the restoring signal S3 can be generated as long as either of the above mechanisms is completed.

Therefore, the input device 1 can provide a plurality of key functions by means of a contact sensing surface 2 without increasing the key regions of the contact sensing surface 2. Thus, the maximum region for the operation of a cursor can be kept. Further, the functions triggered by the key region can be modified without changing the operating modes of the contact sensing surface 2, thereby expanding the input functions.

The input device 1 can also cooperate with a display unit (not shown). The display unit can display a picture corresponding to the key region predetermined on the contact sensing surface and change the displayed picture or the size of the key region based on the change in the key functions.

According to the above, the input device of the present invention really achieves the desired effects and objectives. Also, the present invention demonstrates industrial applicability, novelty, and invention steps, so that the present invention confirms to the requirements for an invention patent.

Although the present invention has been described with reference to the foregoing preferred embodiments, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. An input device, including:
   a contact sensing surface is configured to accept at least one object contact, wherein the contact sensing surface has at least one key region;
   a controller electrically connected to the contact sensing surface, wherein the controller comprises:
   a position-detecting unit configured to detect a position on the contact sensing surface contacted by the object;
   a memory unit configured to store at least one functional data corresponding to a key function;
   a key-triggering unit configured to read the functional data stored in the memory unit and activate the corresponding key function when the object contacts the key region of the contact sensing surface without a sliding within the key region; and
   a key function setting unit configured to change the functional data based on a direction and a distance of the object sliding within the key region and activate another key function corresponding to the changed functional data when the object is sliding within the key region a distance larger than a threshold distance, wherein the key function setting unit changes the functional data in the memory unit as representing a key function of scrolling or paging vertically or horizontally when the direction of object sliding is respectively substantially vertical or substantially horizontal and the distance of the object sliding is larger than the threshold distance.

2. The input device according to claim 1, wherein the controller further comprises an original data restoring unit configured to generate a restoring signal to restore the functional data in the memory unit as a preset original data.

3. The input device according to claim 2, wherein the original data restoring unit detects a leaving period after the object leaves the contact sensing surface and generates the restoring signal when the leaving period is larger than a reference period.

4. The input device according to claim 2, wherein the original data restoring unit receives an external control signal generated by an external control unit and generates the restoring signal after receiving the external control signal.

5. The input device according to claim 1, wherein the key function setting unit changes the functional data in the memory unit as representing a key function of scrolling up or paging up when the direction of object sliding is substantially upward and the distance of object sliding is larger than a first distance.

6. The input device according to claim 1, wherein the key function setting unit changes the functional data in the memory unit as representing a key function of scrolling down or paging down when the direction of object sliding substantially downward and the distance of object sliding is larger than a first distance.

7. The input device according to claim 1, wherein the key function setting unit changes the functional data in the memory unit as representing a key function of scrolling left or paging left when the direction of object sliding is substantially leftward and the distance of object sliding is larger than a second distance.

8. The input device according to claim 1, wherein the key function setting unit changes the functional data in the memory unit as representing a key function of scrolling right or paging right when the direction of object sliding is substantially rightward and the distance of object sliding is larger than a second distance.

9. The input device according to claim 1, wherein the contact sensing surface has a first key region and a second key region, the memory unit stores therein a first functional data and a second functional data, the key-triggering unit reads out the first functional data stored in the memory unit to activate a first key function when the object contacts the first key region of the contact sensing surface without a sliding into the first key region, and the key-triggering unit reads out the second functional data stored in the memory unit to activate a second key function when the object contacts the second key region of the contact sensing surface without a sliding into the second key region.

10. An input device, including:
    a contact sensing surface is configured to accept at least one object contact, wherein the contact sensing surface has at least one key region;
    a controller electrically connected to the contact sensing surface, wherein the controller comprises:
    a position-detecting unit configured to detect a position on the contact sensing surface contacted by the object;

a memory unit configured to store at least one functional data corresponding to a key function;

a key-triggering unit configured to read the functional data stored in the memory unit and activate the corresponding key function when the object contacts the key region of the contact sensing surface without a sliding within the key region; and a key function setting unit configured to change the functional data based on a direction and a distance of the object sliding within the key region and activate another key function corresponding to the changed functional data when object is sliding within the key region a distance larger than a threshold distance, wherein the key function setting unit changes the functional data in the memory unit as representing a key function of zooming in a window when the direction of object sliding is substantially to down-left, down-right, up-left, or up-right corner of the key region and the distance of the object sliding is larger than the threshold distance.

11. An input device, including:

a contact sensing surface is configured to accept at least one object contact, wherein the contact sensing surface has at least one key region;

a controller electrically connected to the contact sensing surface, wherein the controller comprises:

a position-detecting unit configured to detect a position on the contact sensing surface contacted by the object;

a memory unit configured to store at least one functional data corresponding to a key function;

a key-triggering unit configured to read the functional data stored in the memory unit and activate the corresponding key function when the object contacts the key region of the contact sensing surface without a sliding within the key region; and a key function setting unit configured to change the functional data based on a direction and a distance of the object sliding within the key region and activate another key function corresponding to the changed functional data when object is sliding within the key region a distance larger than a threshold distance, wherein the key function setting unit changes the functional data in the memory unit as representing a key function of rotating a window when the direction of object sliding is substantially counter-clockwise and the distance of object sliding is larger than the threshold distance.

* * * * *

UNITED STATES PATENT AND TRADEMARK OFFICE
CERTIFICATE OF CORRECTION

PATENT NO. : 8,466,888 B2
APPLICATION NO. : 12/770024
DATED : June 18, 2013
INVENTOR(S) : Jao-Ching Lin et al.

Page 1 of 1

It is certified that error appears in the above-identified patent and that said Letters Patent is hereby corrected as shown below:

On the title page, item (75), correct the citizenship of the fourth inventor from "Chung-Yi Shen (JP)" to --Chung-Yi Shen (TW)--.

Signed and Sealed this
Thirteenth Day of August, 2013

Teresa Stanek Rea
*Acting Director of the United States Patent and Trademark Office*